(12) United States Patent
Nam

(10) Patent No.: US 10,733,733 B1
(45) Date of Patent: Aug. 4, 2020

(54) METHOD FOR DETECTING ANOMALY USING GENERATIVE ADVERSARIAL NETWORKS, APPARATUS AND SYSTEM THEREOF

(71) Applicant: Lunit Inc., Seoul (KR)

(72) Inventor: Hyeon Seob Nam, Seoul (KR)

(73) Assignee: LUNIT INC., Seoul (KR)

( * ) Notice: Subject to any disclaimer, the term of this patent is extended or adjusted under 35 U.S.C. 154(b) by 0 days.

(21) Appl. No.: 16/535,277

(22) Filed: Aug. 8, 2019

(30) Foreign Application Priority Data

Apr. 19, 2019 (KR) .................. 10-2019-0045836

(51) Int. Cl.
*G06T 7/00* (2017.01)
*G06N 20/00* (2019.01)

(52) U.S. Cl.
CPC .......... *G06T 7/0014* (2013.01); *G06N 20/00* (2019.01); *G06T 2207/20081* (2013.01); *G06T 2207/20084* (2013.01); *G06T 2207/30096* (2013.01)

(58) Field of Classification Search
CPC .............. G06T 7/0014; G06T 7/0012; G06T 2207/20081; G06T 2207/20084; G06T 2207/30096; G06T 2207/10081; G06T 2207/10088; G06T 2207/10132; G06N 20/00
USPC ........................................................ 382/128
See application file for complete search history.

(56) References Cited

U.S. PATENT DOCUMENTS

| | | | |
|---|---|---|---|
| 2016/0022238 A1 | 1/2016 | Park | |
| 2018/0225823 A1* | 8/2018 | Zhou | G06K 9/6267 |
| 2019/0057515 A1* | 2/2019 | Teixeira | A61B 90/39 |
| 2019/0057521 A1* | 2/2019 | Teixeira | A61B 6/463 |
| 2019/0244681 A1* | 8/2019 | Gurcan | G01N 33/5005 |
| 2019/0252073 A1* | 8/2019 | Hsu | G16H 50/20 |

(Continued)

FOREIGN PATENT DOCUMENTS

| | | |
|---|---|---|
| JP | 2019-046269 | 3/2019 |
| KR | 10-2016-0012758 | 2/2016 |

(Continued)

OTHER PUBLICATIONS

Ming-Yu Liu et al., "Unsupervised Image-to-Image Translation Networks", 31st Conference on Neural Information Processing Systems (NIPS 2017), Long Beach, CA, USA., pp. 1-9., Dec. 4, 2017.

(Continued)

*Primary Examiner* — Ali Bayat
(74) *Attorney, Agent, or Firm* — Lex IP Meister, PLLC

(57) ABSTRACT

There is provided an anomaly detection method, apparatus, and system that can improve the accuracy and reliability of a detection result using GAN (Generative Adversarial Networks). An anomaly detection apparatus according to some embodiments includes a memory that stores a GAN-based image translation model and an anomaly detection model, and a processor that translates a learning image with a low-difficulty level into a learning image with a high-difficulty level and learns the anomaly detection model using the translated learning image. The anomaly detection apparatus can improve the detection performance by learning the anomaly detection model with the learning image with the high-difficulty level in which it is difficult detect the anomaly.

20 Claims, 15 Drawing Sheets

(56) References Cited

U.S. PATENT DOCUMENTS

2019/0259153 A1* 8/2019 Zhang .................. G06K 9/6262

FOREIGN PATENT DOCUMENTS

KR        10-1898575     9/2018
KR   10-2018-0117009   10/2018

OTHER PUBLICATIONS

Maayan Frid-Adar et al., "GAN-based Synthetic Medical Image Augmentation for increased CNN Performance in Liver Lesion Classification", Mar. 3, 2018, arXiv:1803.01229v1 [cs.CV].

Xun Huang et al., "Multimodal Unsupervised Image-to-Image Translation", Cornell University, 2018.

* cited by examiner

METHOD FOR DETECTING ANOMALY USING GENERATIVE ADVERSARIAL NETWORKS, APPARATUS AND SYSTEM THEREOF

CROSS-REFERENCES TO THE RELATED APPLICATIONS

This application claims priority from Korean Patent Application No. 10-2019-0045836 filed on Apr. 19, 2019, in the Korean Intellectual Property Office, the disclosure of which is incorporated herein by reference in its entirety.

BACKGROUND

(a) Field

The present disclosure relates to an anomaly detection method, apparatus and system. In particular, the present disclosure relates to a method for improving the accuracy and reliability of a detection result when detecting anomaly in a given image using a machine learning model, and an apparatus and a system for supporting the method.

(b) Description of the Related Art

Machine-learning technologies centered on deep-learning have recently gained greater attention as they have outperformed the existing methods in various data analysis such as an image analysis, an audio analysis and a text analysis. In addition, the machine learning technologies have been introduced various fields due to the extensibility and flexibility inherent in the technologies.

Among the various fields, a medical field is the most actively introducing the machine learning technologies to develop a diagnostic assistance system. The diagnostic assistance system can reduce medical costs by diagnosing diseases in early stages and preventing additional examinations, by using anomaly detection logic based on the machine learning technology.

However, it is not easy to obtain a large set of learning images for small lesions that are not visible to the naked eye or lesions in early stages, and most of the learning image sets are composed of images in which the lesions are well visible. In this case, the diagnostic assistance system cannot accurately detect the lesions in the early stages due to the absence of the learning image sets. As a result, the utility of the diagnostic assistance system is inevitably deteriorated.

SUMMARY

Some embodiments of the present disclosure provide a method for improving the accuracy and reliability of a detection result when detecting anomaly in a given image, and an apparatus and system supporting the method.

Some embodiments of the present disclosure provide a method for improving the accuracy and reliability of a diagnosis result when performing diagnostic logic including lesion detection in a medical image, and an apparatus and system supporting the method.

Some embodiments of the present disclosure provide a method for accurately translating an image with a high-difficulty level in an anomaly detection difficulty into an image with a low-difficulty level, and an apparatus and system supporting the method.

Some embodiments of the present disclosure provide a method for accurately translating an image with a low-difficulty level in an anomaly detection difficulty into an image with a high-difficulty level, and an apparatus and system supporting the method.

Some embodiments of the present disclosure provide a method and an apparatus and system supporting the method for constructing a high-performance image translation model, and an apparatus and system supporting the method.

Some embodiments of the present disclosure provide a method and an apparatus and system supporting the method for constructing a high-performance anomaly detection model, and an apparatus and system supporting the method.

It should be noted that objects of the present disclosure are not limited to the above-described objects, and other objects of the present disclosure will be apparent to the person of ordinary skill in the art from the following descriptions.

According to some embodiments of the present invention, an anomaly detection apparatus including a memory and a processor may be provided. The memory may store a GAN (Generative Adversarial Networks)-based image translation model and an anomaly detection model. The processor may translate a first learning image with a first difficulty level in an anomaly detection difficulty into a second learning image having a second difficulty level being higher than the first difficulty level through the image translation model, and learn the anomaly detection model using the translated second learning image.

In some embodiments, the image translation model may include a first generator that translates an image with the first difficulty level into a fake image with the second difficulty level, and a second generator that translates an image having with second difficulty level into a fake image with the first difficulty level. The processor may translate a detection target image into the detection target image with the first difficulty level through the second generator, in response to an anomaly detection request for the detection target image, and perform anomaly detection on the translated detection target image with the first difficulty level through the anomaly detection model.

In some embodiments, the processor may pre-learn the anomaly detection model using an anomaly image set belonging to an anomaly class and a normal image set belonging to a normal class, classify the anomaly image set into a first image set with the first difficulty level and a second image set with the second difficulty level using the pre-learned anomaly detection model, and learn the image translation model using the first image set and the second image set.

In some embodiments, a target class of the anomaly detection model may include an anomaly class and a normal class. The processor may predict a class to which the second learning image belongs through the anomaly detection model, and update the image translation model using a loss in the prediction.

In some embodiments, a target class of the anomaly detection model may include a fake class. The processor may predict a class to which the second learning image belongs through the anomaly detection model, and update the image translation model using a loss in the prediction.

In some embodiments, a target class of the anomaly detection model may include a first anomaly class corresponding to the first difficulty level and a second anomaly class corresponding to the second difficulty level. The processor may predict a class to which the second learning image belongs through the anomaly detection model, and update the image translation model using a loss in the prediction.

In some embodiments, the image translation model may include a first generator that translates an image with the first difficulty level into a fake image with the second difficulty level, and a second generator that translates an image with the second difficulty level into a fake image with the first difficulty level. The processor may translate the first learning image into the second learning image through the first generator, translate the second learning image into a third learning image with the first difficulty level through the second generator, and update the first generator based on a difference between the first learning image and the third learning image.

According to some embodiments of the present disclosure, an anomaly detection method performed by a computing device may be provided. The computing device may translate a first learning image with a first difficulty level in an anomaly detection difficulty into a second learning image with a second difficulty level being higher than the first difficulty level through a GAN-based image translation model, and learn the anomaly detection model using the translated second learning image.

According to some embodiments of the present disclosure, a computer program may be provided. The computer program may be stored in a computer-readable recording medium to execute translating a first learning image with a first difficulty level in an anomaly detection difficulty into a second learning image with a second difficulty level being higher than the first difficulty level through a GAN-based image translation model, and learning the anomaly detection model using the translated second learning image.

DETAILED DESCRIPTION OF THE EMBODIMENTS

Figure 1:
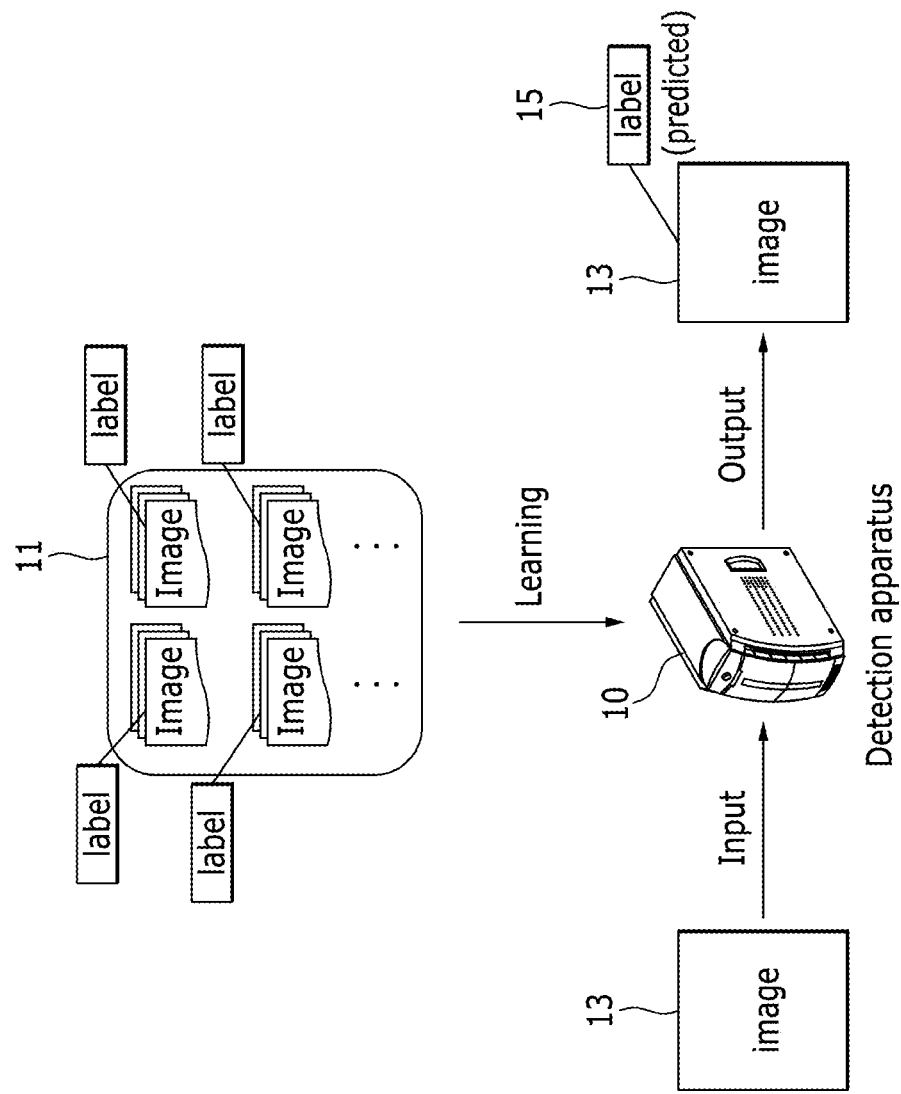
FIG. 1 and FIG. 2 are diagrams for explaining an anomaly detection apparatus 10 according to some embodiments of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to the person of ordinary skill in the art, and the present disclosure will only be defined by the appended claims. Like reference numerals designate like elements throughout the specification.

Unless otherwise defined, all terms (including technical and scientific terms) used herein have the same meaning as commonly understood by the person of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms "a", "an" and "the" are intended to include the plural forms as well, unless the context clearly indicates otherwise.

It will be further understood that, although the terms first, second, A, B, (a), (b), and the like may be used herein to describe various elements, components, steps and/or operations. These terms are only used to distinguish one element, component, step or operation from another element, component, step, or operation. Thus, a first element component, step or operation discussed below could be termed a second element, component, step or operation without departing from the teachings of the present inventive concept. It will be further understood that when an element is referred to as being "connected to" or "coupled with" another element, it can be directly connected or coupled with the other element or intervening elements may be present.

It will be further understood that the terms "comprise" or "comprising", "include" or "including", and "have" or "having" specify the presence of stated elements, steps, operations, and/or devices, but do not preclude the presence or addition of one or more other elements, steps, operations, and/or devices.

Hereinafter, some embodiments of the present disclosure are described in detail with reference to the accompanying drawings.

FIG. 1 is a diagram for explaining an anomaly detection apparatus 10 according to some embodiments of the present disclosure.

Referring to FIG. 1, an anomaly detection apparatus 10 is a computing device equipped with an anomaly detection function. The anomaly may include all objects, such as an abnormal behavior, an abnormal condition, and an abnormal object (e.g., lesion), that are distinguishable from a normal and detectable object. More specifically, the anomaly detection apparatus 10 may construct an anomaly detection model by machine-learning a labeled learning image set 11, and use the anomaly detection model to predict a label 15 of a detection target image 13. Classes of the labels 15 may include a normal class and an anomaly class, but may be further subdivided into multiple classes. In the following description, for convenience of description, it is assumed that the anomaly detection apparatus 10 is referred to as a "detection apparatus" 10.

Figure 17:
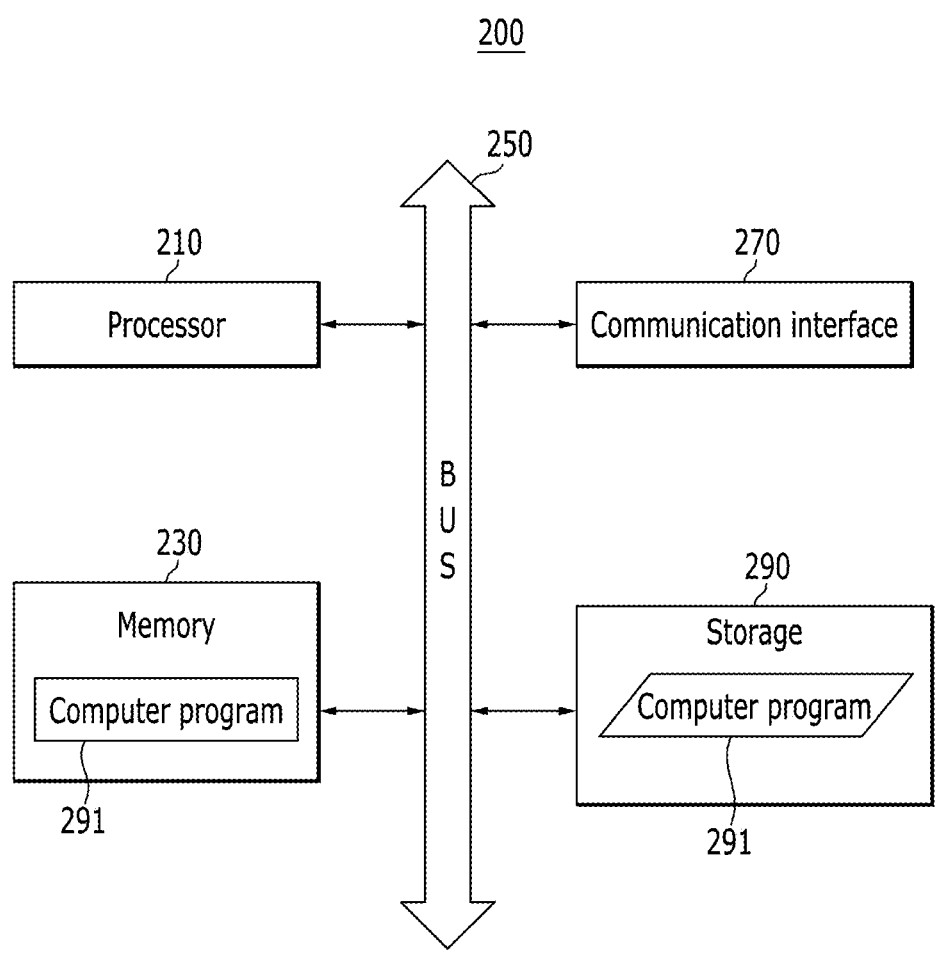
FIG. 17 is an exemplary computing device for implanting an apparatus/system according to various embodiment of the present disclosure.

The computing device may be a tablet computer, a desktop computer, a laptop computer, a server, or the like. However, the computing device is not limited thereto and may include any kind of device having a computing function. An example of the computing device is shown in FIG. 17.

Although FIG. 1 shows the detection apparatus 10 implemented as one computing device by way of example, functions of the detection apparatus 10 may be implemented by an anomaly detection system composed of a plurality of computing devices. In this case, a first function of the detection apparatus 10 may be implemented by a first computing device, and a second function of the detection apparatus 10 may be implemented by a second computing device. Alternatively, the plurality of computing devices may separately implement first and second functions.

The learning image set 11 is learning data set given a true label. For example, the learning image set 11 may include an image set labeled as an anomaly class as the label and an image set labeled a normal class. However, an embodiment is not limited thereto, and the anomaly class or the normal class may be subdivided into a plurality of subclasses. Hereinafter, in order to facilitate understanding, it is assumed that the detection target class is a binary class (that is, anomaly and normal).

Figure 2:
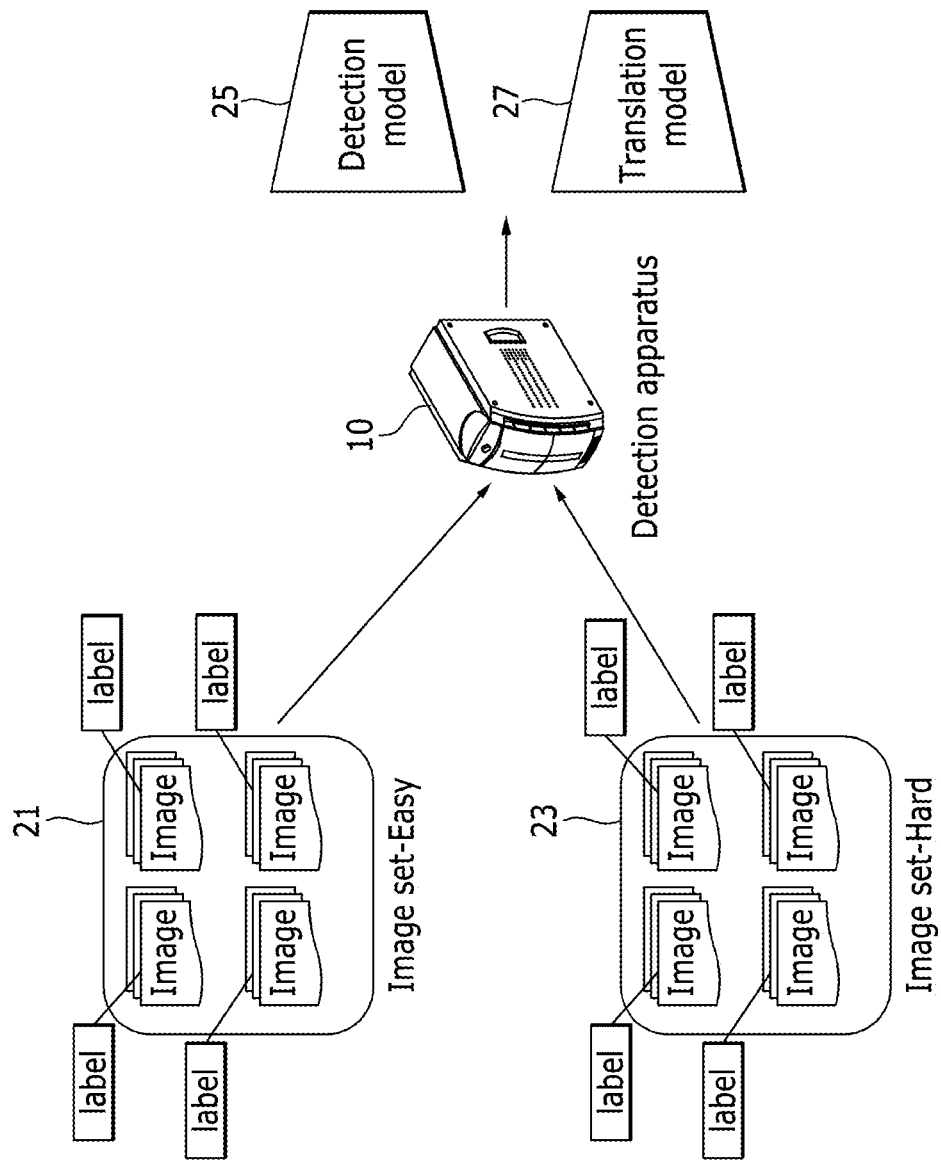

In some embodiments, the detecting apparatus 10 may classify the learning image set belonging to the anomaly class on the basis of an anomaly detection difficulty. For example, as shown in FIG. 2, the detection apparatus 10 may classify the learning image set into a first image set 21 with a first difficulty level and a second image set 23 with a second difficulty level. Here, the first difficulty level means that the anomaly detection difficulty is less than a reference value, and the second difficulty level means that the anomaly detection difficulty is equal to or greater than the reference value. In addition, the detection apparatus 10 may learn a GAN (Generative Adversarial Network)-based image translation model 27 using the first image set 21 and the second image set 23. Through the learning, the image translation model 27 can translate the image with the first difficulty level into a fake image with the second difficulty level, or vice versa.

When the image translation model 27 is sufficiently learned, the detection apparatus 10 may translate the images with the first difficulty level (e.g., an image set 21) into the fake images with the second difficulty level through the image translation model 27, and learn an anomaly detection model 25 using the translated fake images. As a result, the detection performance of the anomaly detection model 25 can be improved. That is, the detection apparatus 10 can detect the anomaly with high accuracy for a high-resolution image (e.g., an image including a lesion in an early stage) which is difficult to detect the anomaly, through the anomaly detection model 25. A more detailed description of the present embodiment is described in detail with reference to FIG. 3 and the subsequent figures.

Hereinafter, for convenience of description, the image translation model is referred to as a "translation model" and the anomaly detection model is referred to as a "detection model."

The detection apparatus 10 according to some embodiments of the present disclosure has been described above with reference to FIG. 1 and FIG. 2. Next, an anomaly detection method according to various embodiments of the present disclosure is described with reference to FIG. 3 to FIG. 15.

Each step of a method to be described below may be performed by a computing device. In other words, each step of the method may be implemented as one or more instructions which are executed by a processor of the computing device. Although all steps included in the method may be executed by one physical computing device, they may be distributed and executed on a plurality of computing devices. For example, first steps of the method may be performed by a first computing device, and second steps of the method may be performed by a second computing device. Assuming that each step of the method is performed by the detection apparatus 10 exemplified in FIG. 1, the method is described below. Therefore, when a subject of a specific operation is omitted in the following description, the corresponding operation may be considered to be performed by the exemplified detection apparatus 10. Further, in the method according to the present embodiment, an execution sequence of operations may be changed as necessary as long as the sequence is logically changed.

Figure 3:
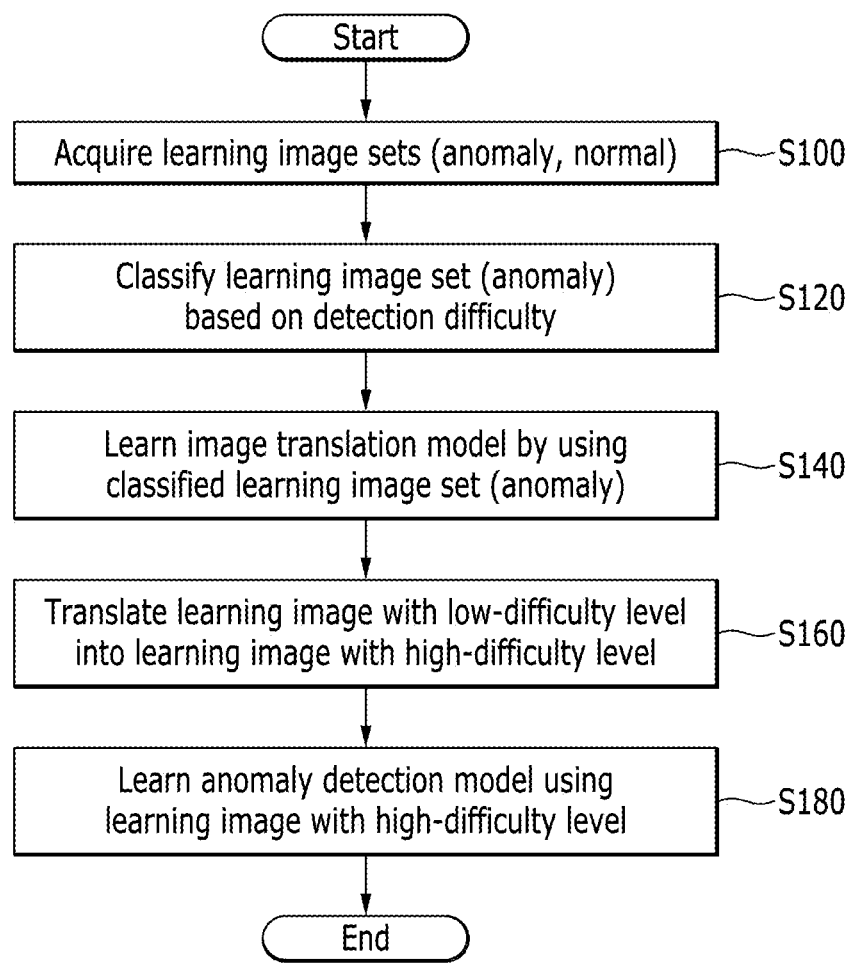
FIG. 3 is an exemplary flowchart showing a learning process of an anomaly detection method according to some embodiments of the present disclosure.

FIG. 3 is an exemplary flowchart showing a learning process of an anomaly detection method according to some embodiments of the present disclosure. That is, FIG. 3 exemplifies a process of constructing a translation model and a detection model through machine learning. However, the flowchart shown in FIG. 3 merely corresponds to an exemplary embodiment for achieving an object of the present disclosure, and some steps may be added or omitted as necessary.

As shown in FIG. 3, the learning process begins with step S100 of acquiring a learning image set. The learning image set may be a data set given a true label, and may include a learning image set belonging to an anomaly class and a learning image set belonging to a normal class.

In step S120, the learning image set belonging to the anomaly class is classified based on an anomaly detection difficulty. For example, the learning image set may be classified as an image set with a low-difficulty level and an image set with a high-difficulty level. In another example, the learning image set may be classified into three or more image sets based on the anomaly detection difficulty. Hereinafter, in order to facilitate understanding, it is assumed that the learning image set is classified into the image set with the low-difficulty level and the image set with the high-difficulty level.

The specific method of classifying the learning image set may vary depending on embodiments.

Figure 4:
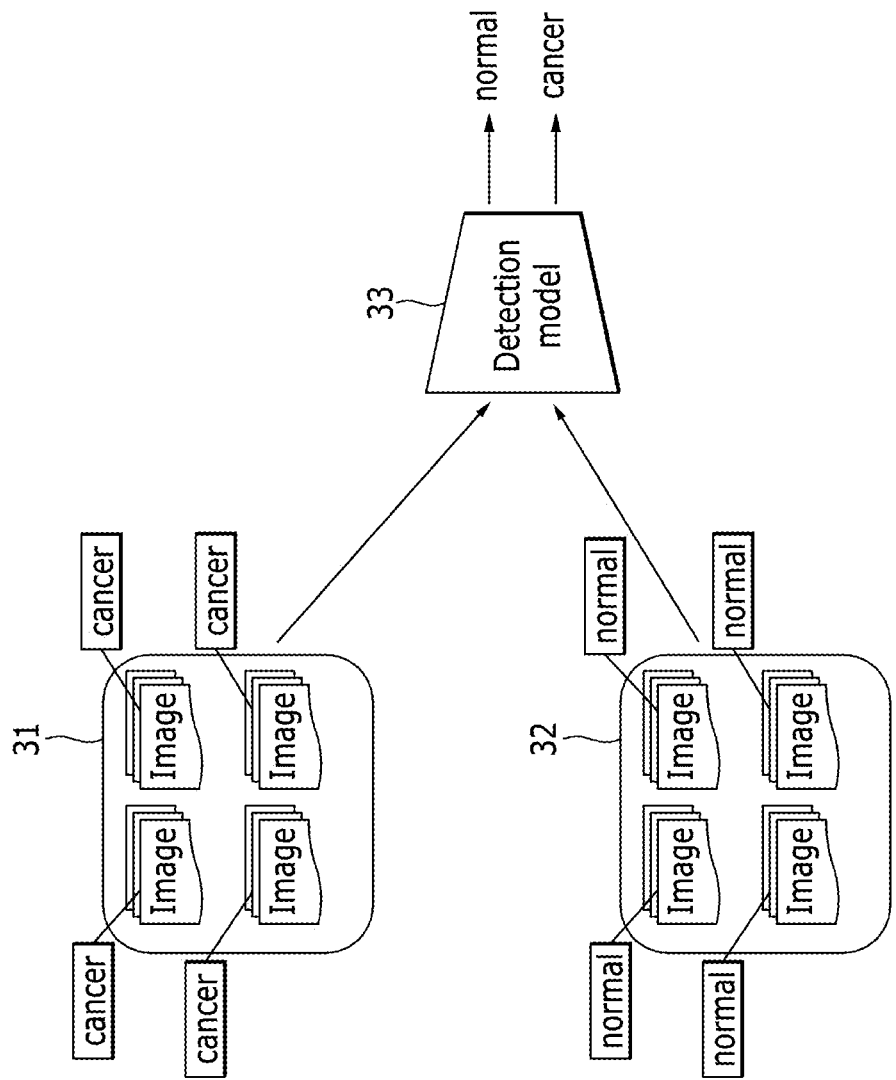
FIG. 4 and FIG. 5 are exemplary diagrams for explaining a method of classifying learning image set according to some embodiments of the present disclosure.
Figure 5:
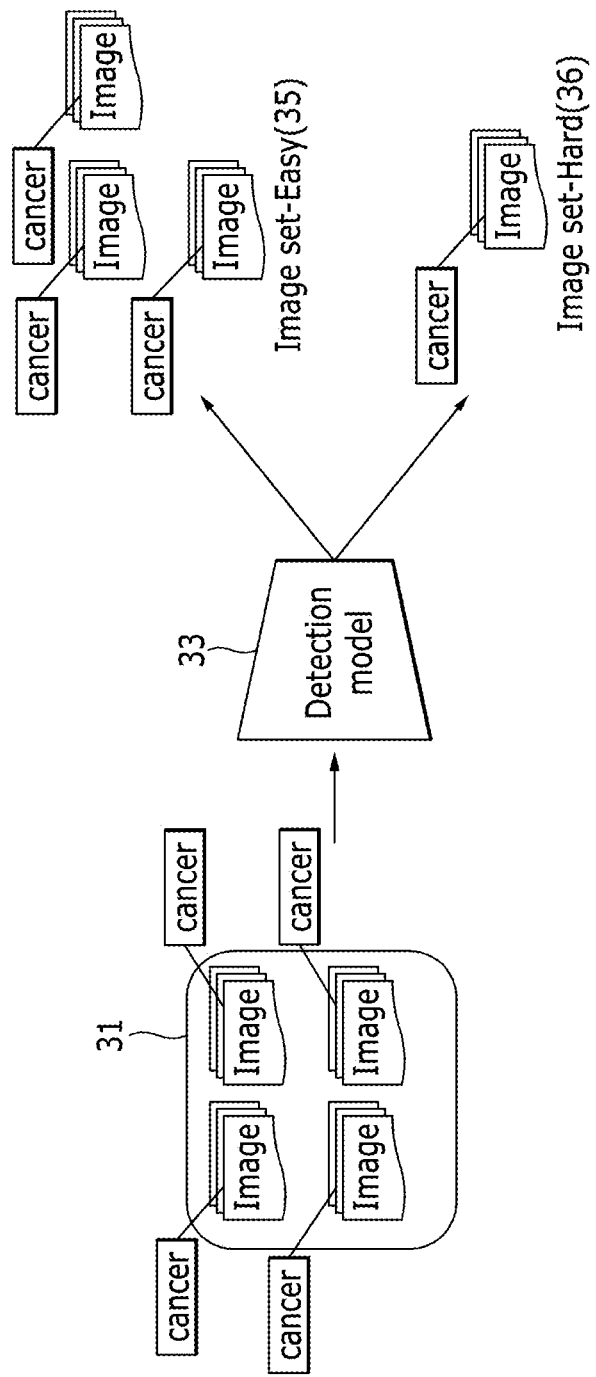

In some embodiments, the learning image set may be automatically classified based on an anomaly score output by the detection model (e.g., a confidence score of the anomaly class). The present embodiment is described in more detail with reference to FIG. 4 and FIG. 5. FIG. 4 and FIG. 5 show that a detection model 33 is a model for detecting a lesion related to cancer. Unless otherwise described, it is assumed that the detection model is also a model (e.g., a cancer diagnosis model) for diagnosing a disease or detecting a lesion. However, this is merely exemplified for some embodiments of the present disclosure, and the detection target of the anomaly detection model may vary depending on embodiments.

As shown in FIG. 4, learning on the detection model 33 may be performed before the learning image set (e.g., images in which the lesion is detected) belonging to the anomaly class is classified. That is, sufficient learning may be preceded in order for the anomaly score of the detection model 33 to accurately reflect the anomaly detection difficulty. The detection model 33 may be learned by using the learning image set 31 corresponding to the anomaly class and the learning image set 32 corresponding to the normal class.

Next, referring to FIG. 5, the image set 31 belonging to the anomaly class may be classified into a first image set 35 with a low-difficulty level and a second image set 36 with a high-difficulty level. For example, images with the anomaly score of the detection model 33 being equal to or greater than a reference value may be classified as the first image set 35, and images with the anomaly score being less than the reference value may be classified as the second image set 36. The reference value may be a predetermined fixed value or a variation value that varies depending on the situation. For example, the reference value may be the variation value that is determined to be a higher value as the accuracy of the detection model 33 is lower. In the present embodiment, since the image set is classified based on the anomaly score of the detection model 33, images that are difficult to analyze in the viewpoint of the detection model 33 may be classified as images with the high-difficulty level. For example, an image including a lesion in an early stage, an image including a lesion with a very small size, and an image including a lot of noise may be classified as images with the high-difficulty level.

In some embodiments, the learning image set may be classified based on meta information or annotation information of an image. The meta information or annotation information may include various information such as a resolution of the image, a format of the image, a level of included noise, or information related to the detection target (e.g., a progress stage of the lesion, a size of the lesion or the like). For example, the learning image set may be classified based on the size of the lesion. That is, images including a small lesion may be classified as the images with the high-difficulty level. As another example, the learning image set may be classified based on the progress stage of the lesion. That is, images including a lesion at the early stage may be classified into the images with the high-difficulty level.

Referring back to FIG. 3, the learning process is continuously described.

In step S140, the translation model is learned by using the classified learning image set. The translation model is a model for performing an image translation function, and may be implemented based on a GAN. The GAN means a model that includes a generator which generates a fake image and a discriminator which discriminates a real image and a fake image, and that is constructed through adversarial learning between the generator and the discriminator. The person of ordinary skill in the art can obviously understand the basic structure and operation of the GAN, so that a detailed description of the GAN is omitted.

Figure 6:
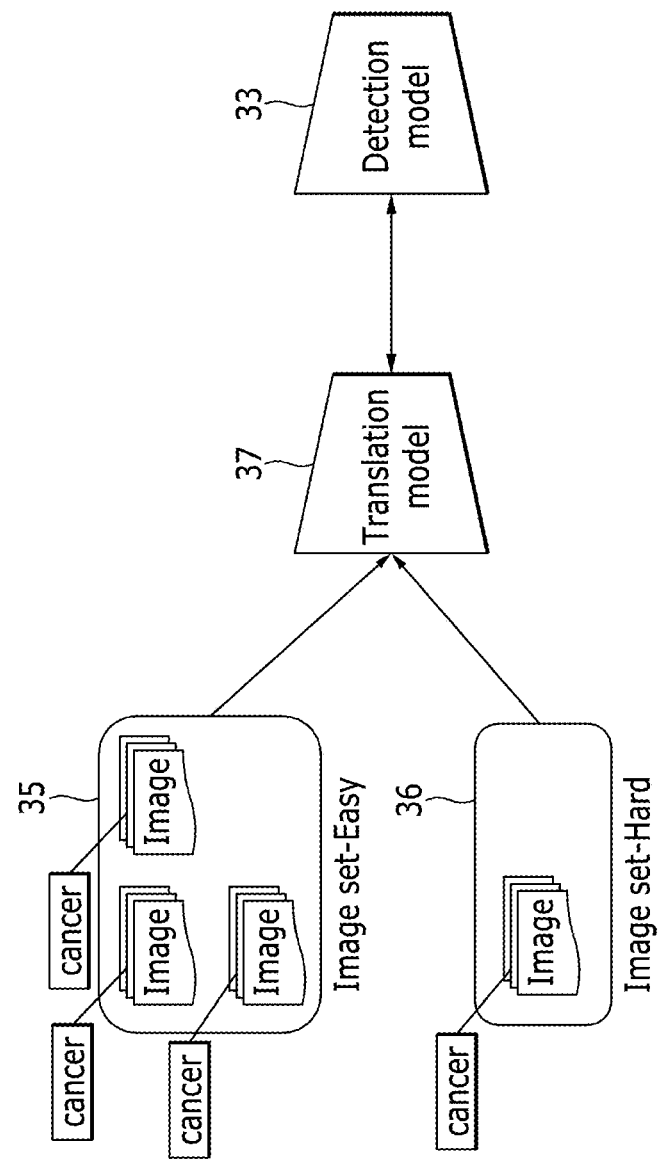
FIG. 6 is an exemplary diagram for explaining a learning method of an image translation model to some embodiments of the present disclosure.

According to some embodiments of the present disclosure, as shown in FIG. 6, the translation model 37 may be further learned by using a prediction loss of the detection model 33. That is, not only the adversarial learning may be performed between the generator and the discriminator, but also the translation model 37 may be learned by using the prediction loss of the detection model 33. As a result, the performance of the translation model 37 can be further improved. Further, while the translation model 37 is learned, the detection model 33 may be learned together. The learning of the translation model 37 and the learning of the detection model 33 may be performed simultaneously, sequentially, or alternately. The translation model 37 may be implemented based on GANs of various structures, and the specific learning method may vary depending on the structure of the GAN. The specific learning method for the translation model 37 will be described in detail with reference to FIG. 7 to FIG. 14.

Referring back to FIG. 3, the learning process is continuously described.

In step S160, the learning image with the low-difficulty level is translated into the learning image with the high-difficulty level through the learned translation model. The learning image with the high-difficulty level may mean a fake image synthesized through the generator of the translation model. The image with the high-difficulty level that can improve the performance of the detection model can be easily obtained through this step.

In step S180, the detection model is learned by using the learning image with the high-difficulty level. For example, the detection model which has been pre-learned in step S120 or the detection model which has been learned together with the translation model in step S160 may be further fine-tuned by using the learning image with the high-difficulty level. As a result, the detection performance of the detection model can be greatly improved.

In some embodiments, a data augmentation technique may be used for the learning of the detection model. The data augmentation technique means a technique of generating new images having the same label through image transformation without changing the label (i.e., class) of images. In this case, the image transformation may be performed in various ways such as cropping, flipping, color jittering, rotation, noise injection, and the like. In the present embodiment, the data augmentation technique may be applied to increase the number of learning images with the high-difficulty level belonging to the anomaly class. In addition, the detection model may be further learned by using the new images generated through the data augmentation. The data augmentation technique may be applied not only to the real image but also to the fake image synthesized through the translation model. According to the present embodiment, since the learning is further performed on the images with the high-difficulty level, the performance of the detection model can be further improved.

The learning process of the anomaly detection method according to some embodiments of the present disclosure has been described with reference to FIG. 3 to FIG. 6. According to the above-described embodiments, the fake images with the high-difficulty level can easily be acquired through the translation model, and the additional learning on the detection model can be performed by using the fake images. Thus, the high-performance detection model can be constructed.

Hereinafter, a structure and learning method of a translation model are described in more detail with reference to FIG. 7 to FIG. 10.

Figure 7:
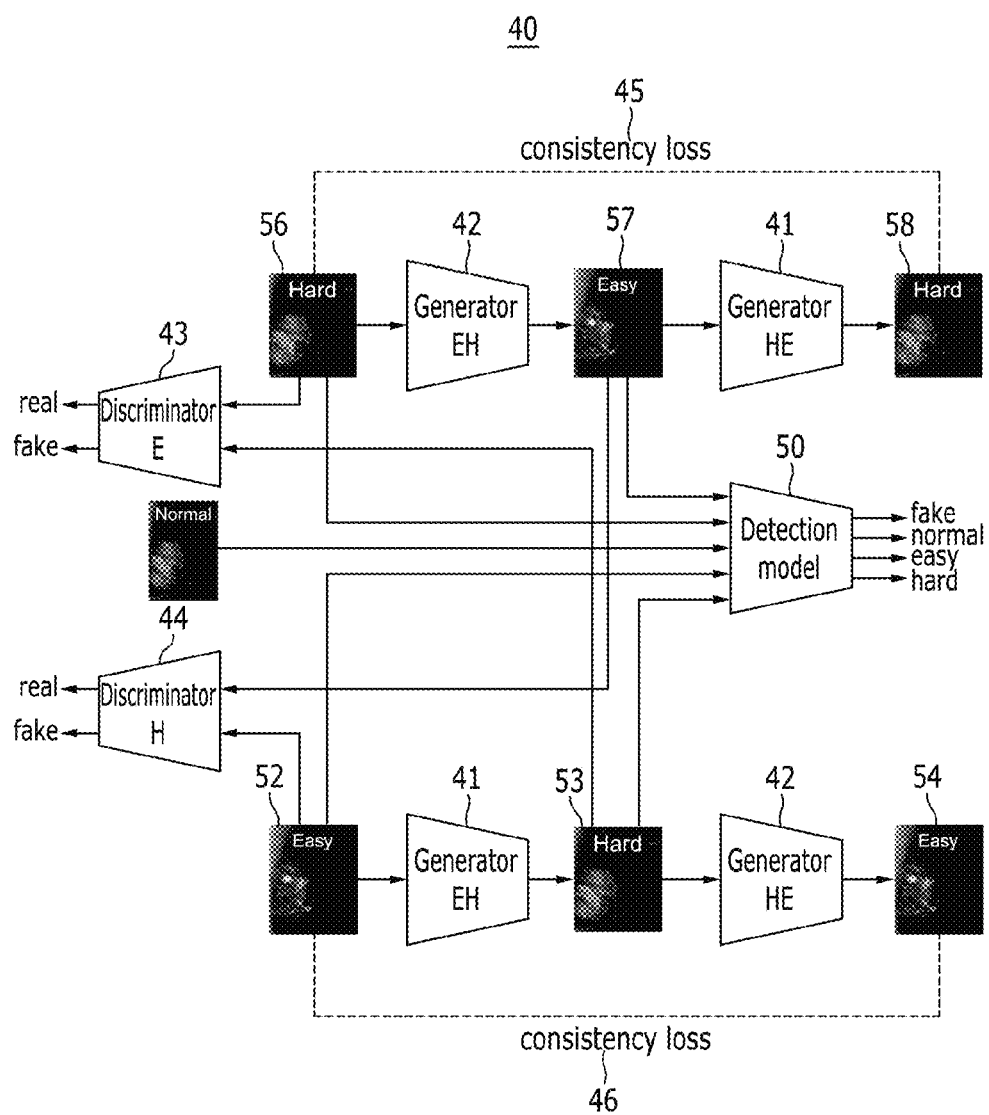
FIG. 7 is a diagram for explaining a structure and learning method of a translation model according to a first embodiment of the present disclosure.

FIG. 7 is a diagram for explaining a structure and learning method of a translation model 40 according to a first embodiment of the present disclosure.

As shown in FIG. 7, a translation model 40 according to a first embodiment may include a first generator 41, a second generator 42, a first discriminator 43, and a second discriminator 44.

The first generator 41 is a module that translates an image 52 with a low-difficulty level into a fake image 53 with a high-difficulty level. The first discriminator 43 is a module that discriminates the real image 56 and fake image 53 with the high-difficulty level. The first generator 41 and the first discriminator 43 may be learned complementarily through adversarial learning.

In addition, the first generator 41 may be further learned by using a first consistency loss 46. The first consistency loss 46 may be calculated based on a difference between a real image 52 input to the first generator 41 and a fake image 54 translated through the second generator 42. Here, the fake image 54 means an image obtained by translating the fake image 53 translated through the first generator 41 back to the original difficulty level through the second generator 42. By learning the first consistency loss 46, the first generator 41 can perform the image translation accurately even if an image set is not configured by a pair of images. The first consistency loss 46 may be calculated based on, for example, a Euclidian distance, a cosine similarity, or the like, but the technical scope of the present disclosure is not limited to the above listed examples.

Further, the first generator 41 may be further learned by using a prediction loss of a detection model 50. For example, when the prediction loss of the detection model 50 is calculated for the fake image 53 translated through the first generator 41, the first generator 41 may be updated by using the prediction loss. In this case, the first generator 41 may be learned so as to generate a fake image 53 that is closer to the high-difficulty level (that is, so as to be classified as an anomaly class corresponding to the high-difficulty level through the detection model 50). The prediction loss may be calculated based on, for example, a cross-entropy loss function, but the technical scope of the present disclosure is not limited to the above listed examples.

The second generator 42 is a module that translates the image 56 with the high-difficulty level to an image 57 with the low-difficulty level. The second discriminator 44 is a module that discriminates the real image 52 and fake image 57 with the low-difficulty level. The second generator 42 and the first discriminator 44 may be learned complementarily through adversarial learning.

Furthermore, the second generator 42 may be further learned by using a second coherence loss 45. The learning process of the second generator 42 is similar to that of the first generator 41 and its further description is omitted.

Additionally, the second generator 42 may be further learned by using the prediction loss of the detection model 50. For example, when the prediction loss of the detection model 50 is calculated for the fake image 57 translated through the second generator 42, the second generator 42 may be updated by using the prediction loss. In this case, the second generator 42 may be learned so as to synthesize the fake image 57 that is closer to the low-difficulty level.

In some embodiments, the translation model 40 and the detection model 50 may be complementarily learned. Because the detection model 50 learns the fake image synthesized by the generators 41 and 42 and the generators 41 and 42 learn the prediction loss of the detection model 50, the performance of the detection model 50 and the performance of the generators 41 and 42 can be improved together. More specifically, the detection model 50 may be learned by using the normal image 51, the real images 52 and 56 with the different difficulty levels, and the fake images 53 and 57 synthesized by the respective generators 41 and 42, and each of the generators 41 and 42 may be learned by using the prediction loss of the detection model 50 for the fake images 53 and 57. These learning may be performed sequentially or alternately. In some examples, a model (see FIG. 4 and FIG. 5) that has been pre-learned to classify the learning image set may be used as the detection model 50. In this case, since the detection model 50 is learned in a fine-tuning manner, the detection model 50 can be learned easily, and the computation cost and time cost until reaching the target performance can be reduced.

On the other hand, FIG. 7 shows an example in which the detection model 50 detects four classes, but the types of the detection target classes may be variously designed and selected according to embodiments. This will be described with reference to FIG. 11 to FIG. 14.

Figure 8:
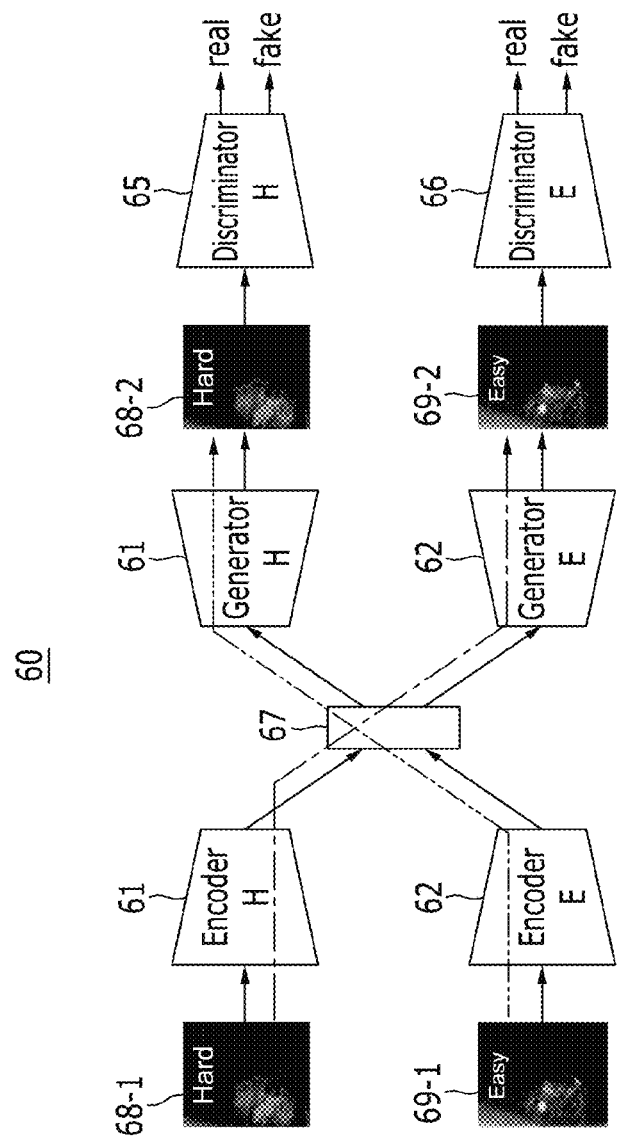
FIG. 8 is a diagram for explaining a structure and learning method of a translation model according to a second embodiment of the present disclosure.

FIG. 8 is a diagram for explaining a structure and learning method of a translation model 60 according to a second embodiment of the present disclosure.

As shown in FIG. 8, a translation model 60 according to a second embodiment may include a first encoder 61, a first generator 63 and a first discriminator 65 associated with a high-difficulty level; and a second encoder 62, a second generator 64 and a second discriminator 66 associated with a low-difficulty level.

The first encoder 61 is a module that encodes an image 68-1 with the high-difficulty level into encoded data 67, and a second encoder 62 is a module that encodes an image 69-1 with the low-difficulty level into the encoded data 67. The encoded data 67 may be understood as data on a latent shared space that is potentially shared between the image with the high-difficulty level and the image with the low-difficulty level (i.e., between different domains).

The first generator 63 is a module that generates a fake image 68-2 with the high-difficulty level based on the encoded data 67. Similarly, the second generator 64 is a module that generates a fake image 69-2 with the low-difficulty level based on the encoded data 67.

The first determiner 65 is a module that performs a discriminating operation on the images with the high-difficulty image, and the second determiner 66 is a module that performs a discriminating operation on the images with the low-difficulty level. Adversarial learning may be performed between the first determiner 65 and the first generator 63, and adversarial learning may be also performed between the second determiner 66 and the second generator 64.

Further, learning may be performed according to the flow shown in FIG. 8 for image translation. For example, when the encoding data 67 for the image 69-1 with the low-difficulty level is input to the first generator 63, the learning may be performed so that the image 69-1 with the low-difficulty level can be translated into the fake image 68-2 with the high-difficulty level. Similarly, when the encoding data 67 for the image 68-1 with the high-difficulty level is input to the second generator 64, the learning may be performed so that the image 68-1 with the high-difficulty level can be translated to the fake image 69-2 with the low-difficulty level. Refer to the paper titled "UNIT: Unsupervised Image-to-Image Translation" for the specific learning method. The actual image translation may also be performed according to the flow shown in FIG. 8.

Although not shown in FIG. 8, each of the generators 63 and 64 may be further learned by using the prediction loss of the detection model (e.g., 50 in FIG. 7). More specifically, the prediction loss for the fake image synthesized by each of the generators 63 and 64 may be calculated through the detection model, and each of the generators 63 and 64 may be updated based on the prediction loss.

Figure 9:
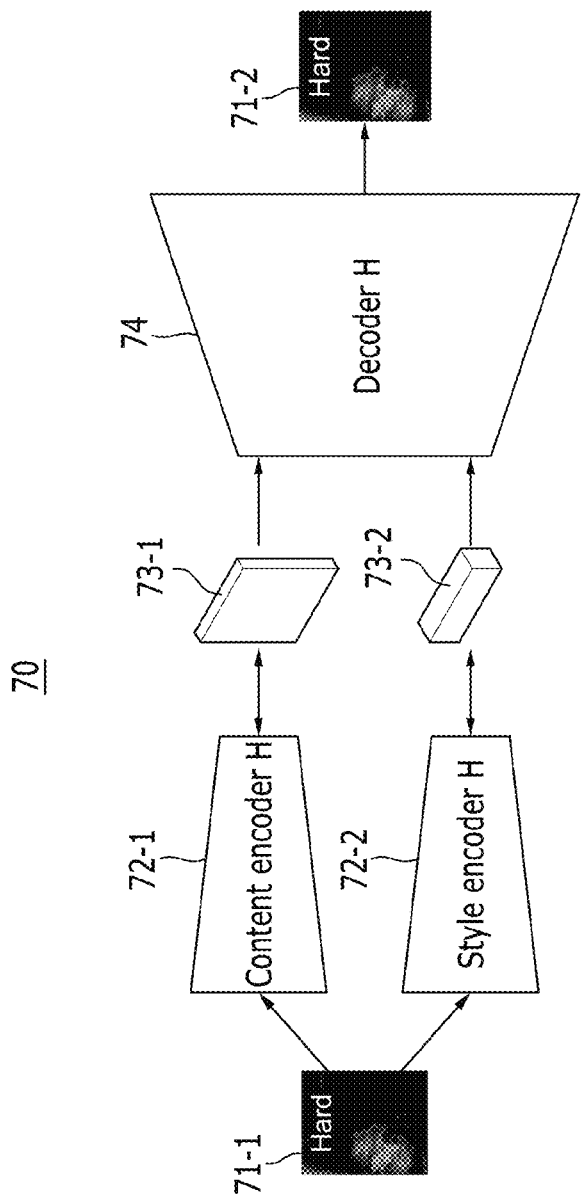
FIG. 9 and FIG. 10 are drawings for explaining a structure and learning method of a translation model according to a third embodiment of the present disclosure.
Figure 10:
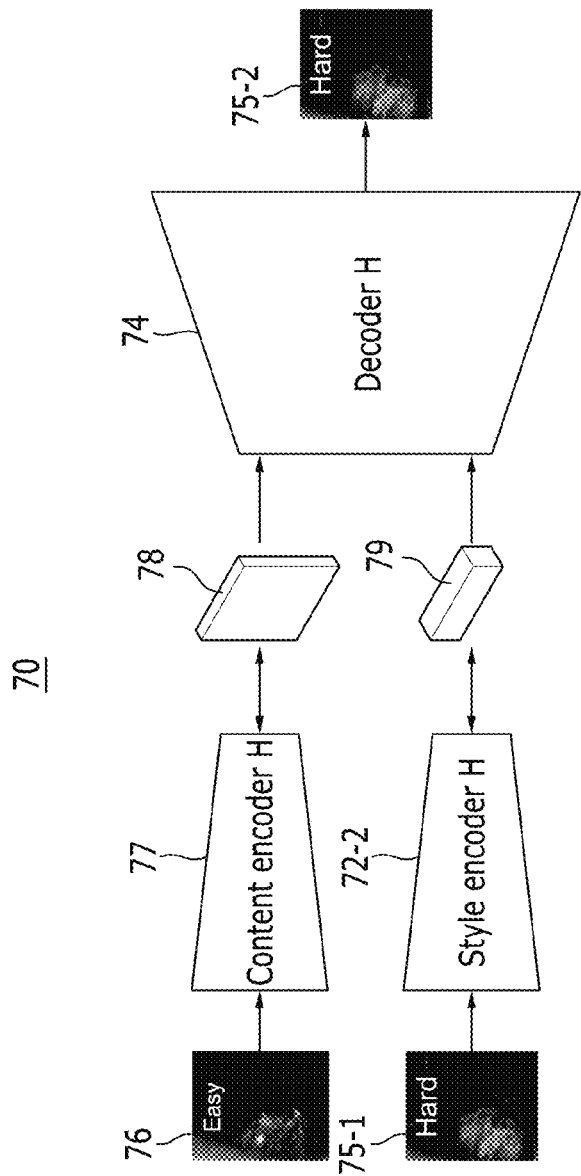

FIG. 9 and FIG. 10 are drawings for explaining a structure and learning method of a translation model according to a third embodiment of the present disclosure.

FIG. 9 shows a first transformation model 70 associated with a high-difficulty level. As shown in FIG. 9, the first translation model 70 may include a content encoder 72-1, a style encoder 72-2, and a decoder. Although not shown in FIG. 9, a second translation model (not shown) associated with a low-difficulty level may include the same elements.

The content encoder 72-1 encodes an image 71-1 with the high-difficulty level into a content code 73-1, and the style encoder 72-2 encodes the image 71-1 with the high-difficulty level into a style code 73-2. That is, in the present embodiment, the representation of the image may be decomposed into two formats.

The content code 73-1 is data representing an abstract feature (e.g., a pose of an object) commonly appearing in multiple domains (that is, images with the high- and low-difficulty levels), and the style code 73-2 is data representing a feature (e.g., a type, a shape or the like of the object) of a specific domain (e.g., the image with the high-difficulty level).

The decoder 74 is a module that synthesizes a fake image belonging to the corresponding domain (i.e., the image with the high-difficulty level) using the content code 73-1 and the style code 73-2.

A first translation model 70 and a second translation model (not shown) may be performed in a cross-domain manner to perform image translation. For the specific learning method, refer to the paper titled "MUNIT: Multimodal Unsupervised Image-to-Image Translation."

The image translation according to a third embodiment may be performed as shown in FIG. 10. FIG. 10 exemplifies that an image 76 with the low-difficulty level is translated into a fake image 75-2 with the high-difficulty level.

As shown in FIG. 10, the decoder 74 may generate the fake image 75-2 with high-difficulty level by decoding a content code 78 for the image 76 with the low-difficulty level and a style code 79 for an image 75-1 with the high-difficulty level. The content code 78 may be generated by a content encoder 77 associated with the low-difficulty level, and the style code 79 may be generated by a style encoder 72-2 associated with the high-difficulty level.

The structure and learning method of the transformation model according to various embodiments of the present disclosure have been described with reference to FIG. 7 to FIG. 10. In addition to the embodiments described above, the translation model may be implemented based on various GAN models (e.g., domain transfer network) that perform the image translation, so the technical scope of the present disclosure is not limited to the GAN of any particular structure.

Hereinafter, embodiments related to an output structure of a detection model are described with reference to FIG. 11 to FIG. 14.

Figure 11:
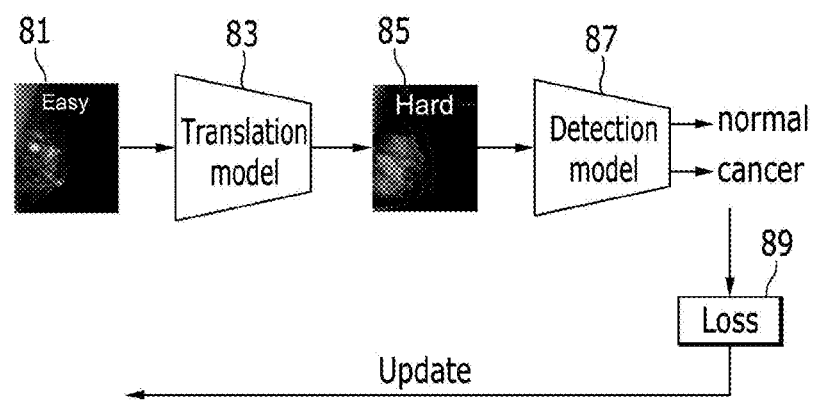
FIG. 11 is a diagram for explaining an output structure of a detection model and a learning method of a translation model according to a first embodiment of the present disclosure.

FIG. 11 is a diagram for explaining an output structure of a detection model 87 and a learning method of a translation model 83 according to a first embodiment of the present disclosure.

As shown in FIG. 11, an output structure of a detection model 87 according to a first embodiment of the present disclosure may be designed to detect a normal class and an anomaly class (e.g., cancer). That is, a target class of the detection model 87 may include the normal class and the anomaly class.

In this case, a translation model 83 may be learned to translate an image while maintaining a class (i.e., learning focused on class maintenance is performed). Specifically, an image 81 with a low-difficulty level may be translated into a faked image 85 with a high-difficulty level through the translation model 83, and a prediction loss 89 for the faked image 85 may be calculated through the detection model 87. Here, the prediction loss 89 may be a value reflecting whether the anomaly class is well maintained while the image 81 with the low-difficulty level is being translated into the fake image 85 with the high-difficulty level. Therefore, if the translation model 83 is updated so as to minimize the prediction loss 89, the translation model 83 can be learned so as to accurately perform the difficulty level translation while maintaining the anomaly class.

Although FIG. 11 shows the case where the image 81 with the low-difficulty level is translated into the fake image 85 with the high-difficulty level, in the opposite case, the translation model 83 may be learned similarly to the above-described case. This may be equally applied to cases shown FIG. 12 to FIG. 14.

Figure 12:
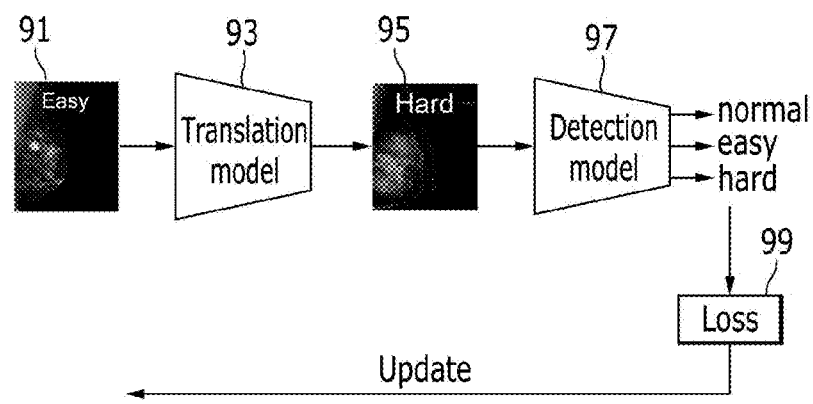
FIG. 12 is a diagram for explaining an output structure of a detection model and a learning method of a translation model according to a second embodiment of the present disclosure.

FIG. 12 is a diagram for explaining an output structure of a detection model 97 and a learning method of a translation model 93 according to a second embodiment of the present disclosure.

As shown in FIG. 12, an output structure of a detection model 97 according to a second embodiment may be designed to detect a normal class, a first anomaly class corresponding to a low-difficulty level (e.g., an easy level), and a second anomaly class corresponding to a high-difficulty level (e.g., a hard level).

In this case, a translation model 93 may be learned so as to accurately perform the difficulty level translation the while maintaining the class (i.e., learning focused on both the class maintenance and the difficulty level translation is performed). Specifically, an image 91 with a low-difficulty level may be translated into a fake image 95 with a high-difficulty level through the translation model 93, and a prediction loss 99 for the faked image 95 may be calculated through the detection model 97. Here, the prediction loss 99 may be a value reflecting whether the anomaly class is well maintained and/or whether the difficulty level translation is correct while the image 91 with the low-difficulty level is being translated into the fake image 95 with the high-difficulty level. Therefore, if the translation model 93 is updated so as to minimize the prediction loss 99, the translation model 93 may be learned so as to accurately perform the difficulty level translation while maintaining the anomaly class.

Figure 13:
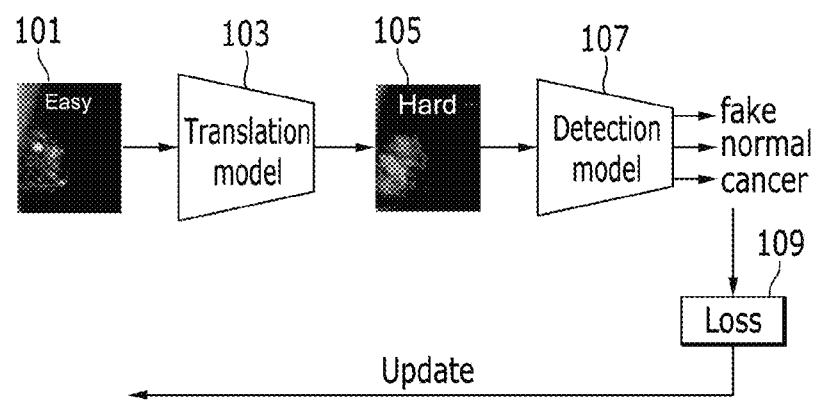
FIG. 13 is a diagram for explaining an output structure of a detection model and a learning method of a translation model according to a third embodiment of the present disclosure.

FIG. 13 is a diagram for explaining an output structure of a detection model 107 and a learning method of a translation model 103 according to a third embodiment of the present disclosure.

As shown in FIG. 13, an output structure of a detection model 107 according to a third embodiment may be designed to detect a fake class, a normal class, and an anomaly class (e.g. cancer). That is, the detection model 107 may be designed to further perform a discrimination operation.

In this case, a translation model 103 may be learned so as to synthesize a fake image close to a real image while maintaining the anomaly class (i.e., learning focused on the class maintenance and the fake image synthesis is performed). Specifically, an image 101 with a low-difficulty level may be translated into a fake image 105 with a high-difficulty level through the translation model 103, and a prediction loss 109 for the fake image 105 may be calculated through the detection model 107. Here, the prediction loss 109 may be a value reflecting whether the anomaly class is well maintained and/or whether the fake image is synthesized close to the real image while the image 101 with the low-difficulty level is being translated into the fake image 105 with the high-difficulty level. Therefore, if the translation model 103 is updated so as to minimize the prediction loss 109, the translation model 103 may be learned so as to synthesize the fake image close to the real image while maintaining the anomaly class.

Figure 14:
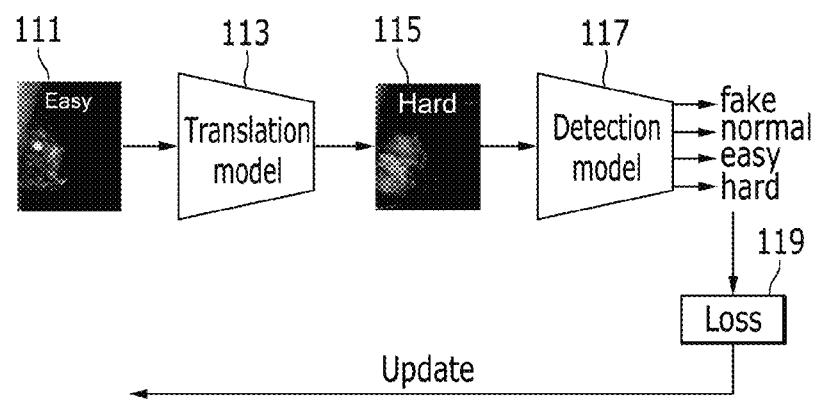
FIG. 14 is a diagram for explaining an output structure of a detection model and a learning method of a translation model according to a fourth embodiment of the present disclosure.

FIG. 14 is a diagram for explaining an output structure of a detection model 117 and a learning method of a translation model 113 according to a fourth embodiment of the present disclosure.

As shown in FIG. 14, an output structure of a detection model 117 according to a fourth embodiment may be designed to detect a fake class, a normal class, a first anomaly class corresponding to a low-difficulty level, and a second anomaly class corresponding to a high-difficulty level.

In this case, a translation model 113 may be learned so as to accurately perform the difficulty level translation and synthesize a fake image close to a real image while maintaining the class (i.e., learning focused on all of the class maintenance, the fake image synthesis and the difficulty translation is performed). Specifically, an image 111 with a low-difficulty level may be translated into a fake image 115 with a high-difficulty level through the translation model 113, and a prediction loss 119 for the faked image 115 may be calculated through the detection model 117. Here, the prediction loss 119 may be a value reflecting, whether the anomaly class is well maintained, whether the difficulty level translation is correct, and/or whether the fake image is synthesized close to the real image while the image 111 with the low-difficulty level is being translated into the fake image 115 with the high-difficulty level. Therefore, if the translation model 113 is updated so as to minimize the prediction loss 119, the translation model 113 may be learned so as to accurately perform the difficulty level translation and synthesize the fake image close to the real image while maintaining the anomaly class.

The output structure of the detection model according to various embodiments of the present disclosure has been described with reference to FIG. 11 to FIG. 14. Since the output structure of the detection model may be designed and selected in various forms in addition to the above-described embodiments, the technical scope of the present disclosure is not limited to the above-described embodiments. For example, the output structure of the detection model may be designed to detect only the first anomaly class corresponding to the low-difficulty level and the second anomaly class corresponding to the high-difficulty level.

Hereinafter, a detection process of an anomaly detection method according to some embodiments of the present disclosure is described with reference to FIG. 15. The detection process means a process of performing anomaly detection on a detection target image that is not labeled.

Figure 15:
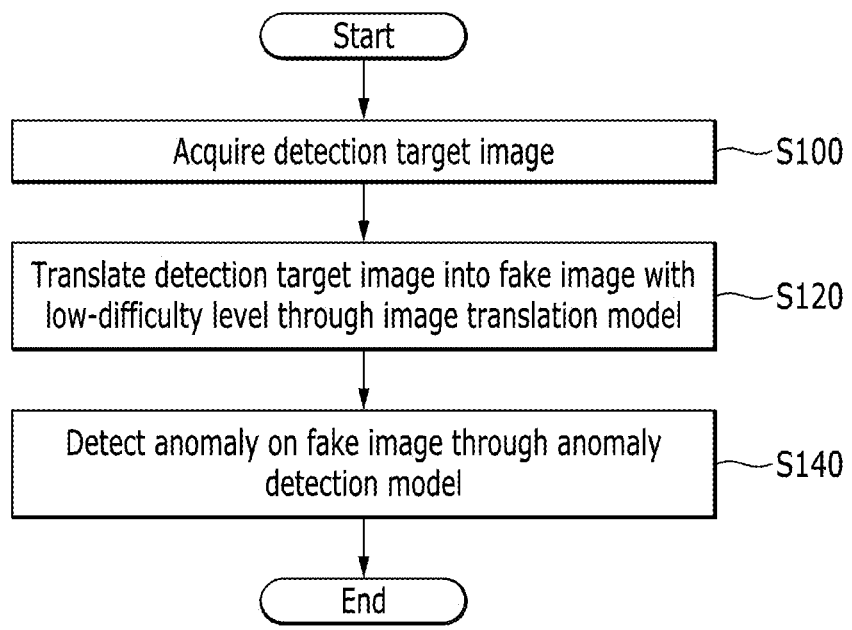
FIG. 15 is an exemplary flowchart showing a detection process of an anomaly detection method according to some embodiments of the present disclosure.

FIG. 15 is an exemplary flowchart showing a detection process. The flowchart merely corresponds to an exemplary embodiment for achieving an object of the present disclosure, and some steps may be added or omitted as necessary.

As shown in FIG. 15, the detection process begins with step S200 of acquiring a detection target image.

In step S220, the detection target image is translated into a fake image with a low-difficulty level through a translation model. That is, the detection target image may be input to a generator of the translation model, and the fake image with the low-difficulty level may be generated through the generator.

In some embodiments, step S220 may be performed only when the detection target image is an image with a high-difficulty image. If the detection target image is an image with the low-difficulty level, it is not necessary to perform the image translation. In the present embodiment, first, it may be determined whether the detection target image is the image with the high-difficulty level through an anomaly score of a detection model. In addition, the detection target image may be translated into the fake image with the low-difficulty level, in response to the determination that the detection target image is the image with the high-difficulty level.

In step S240, anomaly detection is performed on the fake image through an anomaly detection model. Since the fake image is an image whose anomaly detection difficulty is low (i.e., an image showing a lesion well or an image with little noise), the more accurate detection result can be provided through the anomaly detection model.

In some embodiments, a final result may be determined by using a first anomaly detection result for the detection target image and a second anomaly detection result for the fake image together. In other words, since there is a possibility that an important characteristic of the detection target image is lost in the translation process, the final result may be determined by further using the first anomaly detection result in order to compensate for the loss. Here, the final result may be determined by integrating (e.g., performing a weighted sum on) the first anomaly detection result and the second anomaly detection result based on predetermined weights. Further, the weight given to each of the anomaly detection results may be a predetermined fixed value or a variation value that varies depending on a situation. For example, the weight may be the variation value that varies based on the performance of the translation model. In this case, the higher the performance of the translation model is, the higher the weight given to the second anomaly detection result may be.

The anomaly detection method according to various embodiments of the present disclosure has been described with reference to FIG. 3 and FIG. 15. As described above, in contrast to the learning process, the image with the high-difficulty level can be translated into the image with the low-difficulty level in the detection process. As a result, the accuracy of the detection result can be further improved.

The above-described anomaly detection method may be used to diagnose a specific disease (e.g. cancer) in a medical image or to detect a type or location of a lesion related to the specific disease, as exemplified above. That is, the above-described anomaly detection method may be used to constructing a diagnostic assistance system. Hereinafter, a use example of the diagnostic assistance system is briefly described with reference to FIG. 16.

Figure 16:
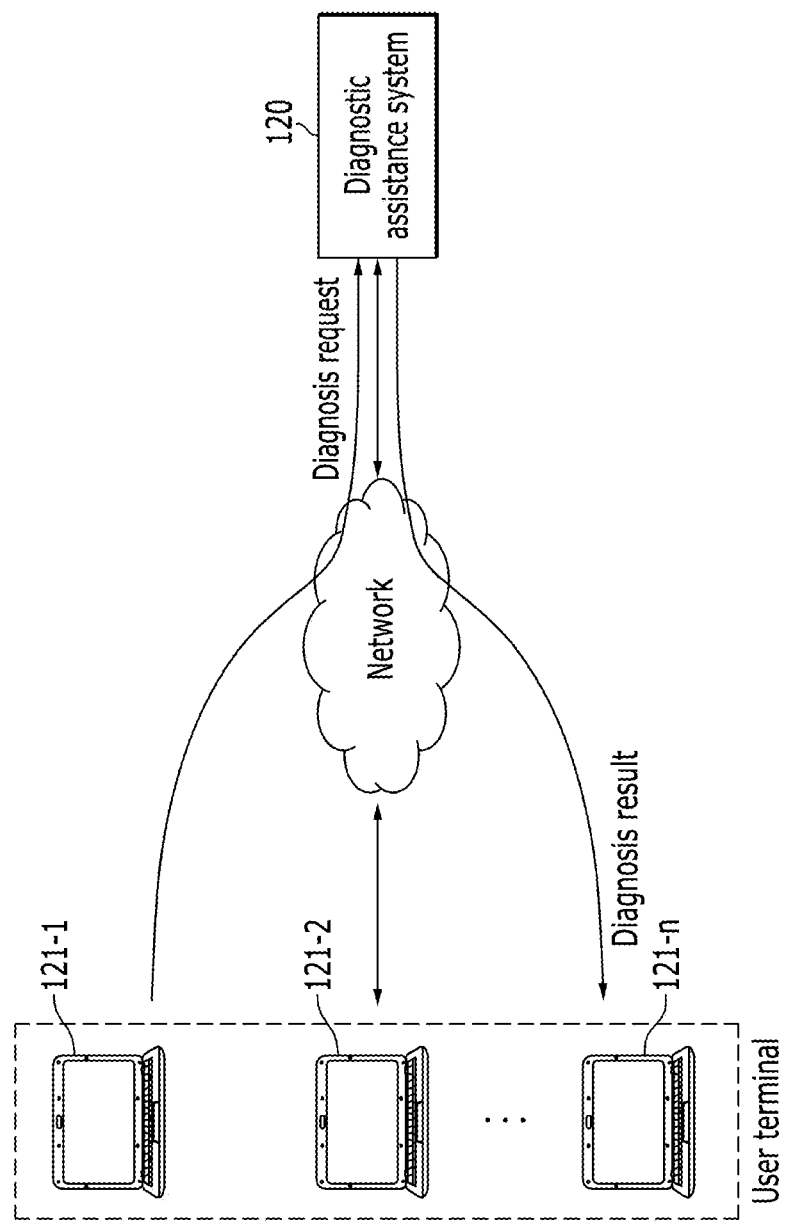
FIG. 16 is a diagram for explaining a diagnostic assistance system 120 according to some use examples of the present disclosure is used.

FIG. 16 is a diagram for explaining a diagnostic assistance system 120 according to some use examples of the present disclosure.

As shown in FIG. 16, a diagnostic assistance system 120 is a system that provides diagnostic assistant services to one or more user terminals 121-1 to 121-n. For example, the diagnostic assistance system 120 may perform diagnosis on users in response to diagnosis requests of the user terminals 121-1 to 121-n and send the diagnosis results to the request terminals 121-1 to 121-n.

The diagnostic assistance system 120 may include a computing device that performs the diagnosis using an anomaly detection method according to an embodiment of the present disclosure. In addition, the diagnostic assistance system 120 may further include an imaging system that captures medical images and a medical data storage device that stores medical images and medical history information of patients.

The diagnostic assistance system 120 may provide diagnostic services using an anomaly detection model in which fake images with a high-difficulty level (e.g., an image including a small lesion, an image including a lesion at an early stage, or the like) are learned. Accordingly, the diagnostic assistance system 120 can accurately detect the lesion in the early stage, and can provide an early diagnosis service for a specific disease (e.g., cancer). As a result, a high-quality medical service can be provided, and the medical expenses required for the additional examination can be reduced.

Although FIG. 16 shows an example in which the diagnostic assistance system 120 provides online diagnostic services through a network, the diagnostic assistance system 120 may provide diagnostic services in online or offline mode in various environments.

For example, the diagnostic assistance system 120 may be used in a form that assists a diagnosis of a doctor in a particular medical facility. In this case, the doctor can provide a high-quality diagnostic service to a patient by using the diagnosis result of the diagnostic assistance system 120 supplementally. Further, if the lesion is not well visible in a medical image (e.g., CT image) of the patient, the doctor may use an image translation function of the diagnostic assistance system 120 to translate the medical image into a fake image in which the lesion is well visible, and may perform a visual inspection using the fake image. Furthermore, the fake image may be used for explaining a progress of the lesion to the patient.

An example in which the technical concept of the present disclosure is applied to the diagnostic assistance system 120 has been described with reference to FIG. 16. Next, an exemplary computing device 200 for implementing an apparatus (e.g., a detection apparatus 10 of FIG. 1) and/or system according to various embodiments of the present disclosure is described with reference to FIG. 17.

FIG. 17 is an exemplary hardware block diagram illustrating a computing device 200. As shown in FIG. 17, a computing device 200 may include one or more processors 210, a bus 250, a communication interface 270, a memory 230 to which a computer program 291 to be executed by the processor 210 is loaded, and a storage 290 which stores the computer program 291. However, FIG. 17 shows only elements related to embodiments of the present disclosure. Therefore, the person of ordinary skill in the art will understand that general elements other than those shown in FIG. 17 may be further included. In other words, various elements other than those shown in FIG. 17 may be further included in the computing device 200.

The processor 210 controls overall operation of each element of the computing device 200. The processor 210 may be configured to include at least one of a central processing unit (CPU), a microprocessor unit (MPU), a microcontroller unit (MCU), a graphics processing unit (GPU), and any form of processor well known in the technical field of the present disclosure. The processor 210 may perform calculation of at least one application or program for executing methods or operations according to embodiments of the present disclosure.

The memory 230 stores various kinds of data, commands, and/or information. To execute methods or operations according to various embodiments of the present disclosure, the memory 230 may load one or more programs 291 from the storage 290. The memory 230 may be implemented as a volatile memory such as a random access memory (RAM), but the technical scope of the present disclosure is not limited thereto.

The bus 250 provides a communication function between elements of the computing device 200. The bus 250 may be implemented as various forms of buses, such as an address bus, a data bus, and a control bus.

The communication interface 270 supports wired or wireless Internet communication of the computing device 200. Further, the communication interface 270 may support various communication methods as well as Internet communication. To this end, the communication interface 270 may include a communication module well known in the technical field of the present disclosure. In some embodiments, the communication interface 270 may be omitted.

The storage 290 may non-temporarily store the one or more programs 291. The storage 290 may include a non-volatile memory, such as a read only memory (ROM), an erasable programmable ROM (EPROM), an electrically erasable programmable ROM (EEPROM), and a flash memory, a hard disk, a removable disk, or any form of computer-readable recording medium well known in the art to which the present disclosure pertains.

The computer program 291 may include one or more instructions which cause the processor 210 to perform methods or operations according to various embodiments of the present disclosure when loaded to the memory 230. In other words, the processor 210 may execute methods or operations according to various embodiments of the present disclosure by performing the one or more instructions. The instructions are a series of computer-readable instructions that are grouped by function and are executed by a processor or a component of a computer program.

For example, the computer program 291 may include instructions to perform an operation of translating a first learning image with a first difficulty level into a second learning image with a second difficulty level which is higher than the first difficulty level in the anomaly detection difficulty, through a GAN (Generative Adversarial Networks)-based image translation model, and an operation of learning an anomaly detection model using the translated second learning image. In addition, the computer program 291 may further include instructions to perform operations according to various embodiments of the present disclosure described above. In this case, the detection apparatus 10 according to some embodiments of the present disclosure may be implemented through the computing device 200.

Various exemplary embodiments of the present disclosure and effects thereof have been described above with reference to FIG. 1 to FIG. 17. The effects of the present disclosure are not limited to those mentioned above, and other effects which have not been mentioned can be clearly understood by the person of ordinary skill in the art from the above description.

The concepts of the disclosure described above with reference to FIG. 1 to FIG. 17 may be embodied as computer-readable code on a computer-readable medium. The computer-readable medium may be, for example, a removable recording medium (a CD, a DVD, a Blu-ray disc, a USB storage device, or a removable hard disc) or a fixed recording medium (a ROM, a RAM, or a computer-embedded hard disc). The computer program recorded on the computer-readable recording medium may be transmitted to another computing apparatus via a network such as the Internet and installed in another computing device, so that the computer program can be used in another computing device.

The technical concept of the present disclosure is not necessarily limited to these embodiments, as all the elements configuring the embodiments of the present disclosure have been described as being combined or operated in combination. That is, within the scope of the present disclosure, all of the elements may be selectively operable in combination with one or more.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present disclosure has been particularly illustrated and described with reference to embodiments thereof, it will be understood by the person of ordinary skill in the art that various changes in form and detail may be made therein without departing from the spirit and scope of the present disclosure as defined by the following claims. The embodiments should be considered in a descriptive sense only and not for purposes of limitation.

What is claimed is:
1. An anomaly detection apparatus comprising:
a memory that stores a GAN (Generative Adversarial Networks)-based image translation model and an anomaly detection model; and
a processor that translates a first learning image with a first difficulty level indicating an anomaly detection difficulty into a second learning image having a second difficulty level indicating an anomaly detection difficulty being higher than the first difficulty level through the image translation model, and learns the anomaly detection model using the translated second learning image,
wherein a target class of the anomaly detection model comprises a plurality of classes, and
wherein the processor:
predicts a class to which the second learning image belongs through the anomaly detection model; and
updates the image translation model using a loss in the prediction.
2. The anomaly detection apparatus of claim 1, wherein the image translation model comprises a first generator that translates an image with the first difficulty level into a fake image with the second difficulty level, and a second generator that translates an image having with second difficulty level into a fake image with the first difficulty level, and
wherein the processor:
translates a detection target image into the detection target image with the first difficulty level through the second generator, in response to an anomaly detection request for the detection target image; and
performs anomaly detection on the translated detection target image with the first difficulty level through the anomaly detection model.
3. The anomaly detection apparatus of claim 1, wherein the processor:
pre-learns the anomaly detection model using an anomaly image set belonging to an anomaly class and a normal image set belonging to a normal class;
classifies the anomaly image set into a first image set with the first difficulty level and a second image set with the second difficulty level using the pre-learned anomaly detection model; and
learns the image translation model using the first image set and the second image set.
4. The anomaly detection apparatus of claim 3, wherein the processor:
translates the first learning image into the second learning image through the learned image translation model; and
learns the pre-learned anomaly detection model using the translated second learning image.
5. The anomaly detection apparatus of claim 1, wherein the target class comprises an anomaly class and a normal class.
6. The anomaly detection apparatus of claim 1, wherein the target class comprises a fake class.
7. The anomaly detection apparatus of claim 1, wherein the target class comprises a first anomaly class corresponding to the first difficulty level and a second anomaly class corresponding to the second difficulty level.
8. The anomaly detection apparatus of claim 1, wherein the image translation model comprises a first generator that translates an image with the first difficulty level into a fake image with the second difficulty level, and a second generator that translates an image with the second difficulty level into a fake image with the first difficulty level, and
wherein the processor:
translates the first learning image into the second learning image through the first generator;
translates the second learning image into a third learning image with the first difficulty level through the second generator; and
updates the first generator based on a difference between the first learning image and the third learning image.
9. The anomaly detection apparatus of claim 8, wherein the processor updates the first generator using a loss in the prediction.
10. The anomaly detection apparatus of claim 8, wherein the image translation model comprises a first discriminator that discriminates the image with the first difficulty level and the fake image with the first difficulty level, and a second discriminator that discriminates the image with the second difficulty level and the fake image with the second difficulty level, and
wherein the processor:
performs adversarial learning between the second generator and the first discriminator; and
performs adversarial learning between the first generator and the second discriminator.

11. The anomaly detection apparatus of claim 1, wherein the image translation model comprises a first encoder that encodes an image with the first difficulty level, a second encoder that encodes an image with the second difficulty level, a first generator that generates a fake image with the first difficulty level using encoded data output from the first encoder or the second encoder, and a second generator that generates a fake image with the second difficulty level using the encoded data, and wherein the processor:
acquires first encoded data for the first learning image through the first encoder; and
inputs the first encoded data to the second generator to translate the first learning image into the second learning image.

12. An anomaly detection method performed by a computing device, the method comprising:
translating a first learning image with a first difficulty level indicating an anomaly detection difficulty into a second learning image with a second difficulty level indicating an anomaly detection difficulty being higher than the first difficulty level through a GAN (Generative Adversarial Networks)-based image translation model; and
learning the anomaly detection model using the translated second learning image,
wherein a target class of the anomaly detection model comprises a plurality of classes, and
wherein learning the anomaly detection model comprises:
predicting a class to which the second learning image belongs through the anomaly detection model; and
updating the image translation model using a loss in the prediction.

13. The method of claim 12, further comprising, before translating the first learning image:
pre-learning the anomaly detection model using an anomaly image set belonging to an anomaly class and a normal image set belonging to a normal class;
classifying the anomaly image set into a first image set with the first difficulty level and a second image set with the second difficulty level using the pre-learned anomaly detection model; and
learning the image translation model using the first image set and the second image set.

14. The method of claim 13, wherein translating the first learning image comprises translating the first learning image into the second learning image through the learned image translation model, and
wherein learning the anomaly detection model comprises learning the pre-learned anomaly detection model using the translated second learning image.

15. The method of claim 12, wherein the target class comprises an anomaly class and a normal class.

16. The method of claim 12, wherein the target class comprises a fake class.

17. The method of claim 12, wherein the target class comprises a first anomaly class corresponding to the first difficulty level and a second anomaly class corresponding to the second difficulty level.

18. The method of claim 12, wherein the image translation model comprises a first generator that translates an image with the first difficulty level into a fake image with the second difficulty level, and a second generator that translates an image with the second difficulty level into a fake image with the first difficulty level, and
wherein translating the first learning image comprises:
translating the first learning image into the second learning image through the first generator;
translating the second learning image into a third learning image with the first difficulty level through the second generator; and
updating the first generator based on a difference between the first learning image and the third learning image.

19. The method of claim 18, wherein updating the first generator comprises:
updating the first generator using a loss in the prediction.

20. The method of claim 18, wherein the image translation model comprises a first discriminator that discriminates the image with the first difficulty level and the fake image with the first difficulty level, and a second discriminator that discriminates the image with the second difficulty level and the fake image with the second difficulty level,
wherein adversarial learning is performed between the second generator and the first discriminator, and
wherein adversarial learning is performed between the first generator and the second discriminator.

* * * * *